Figure 1:
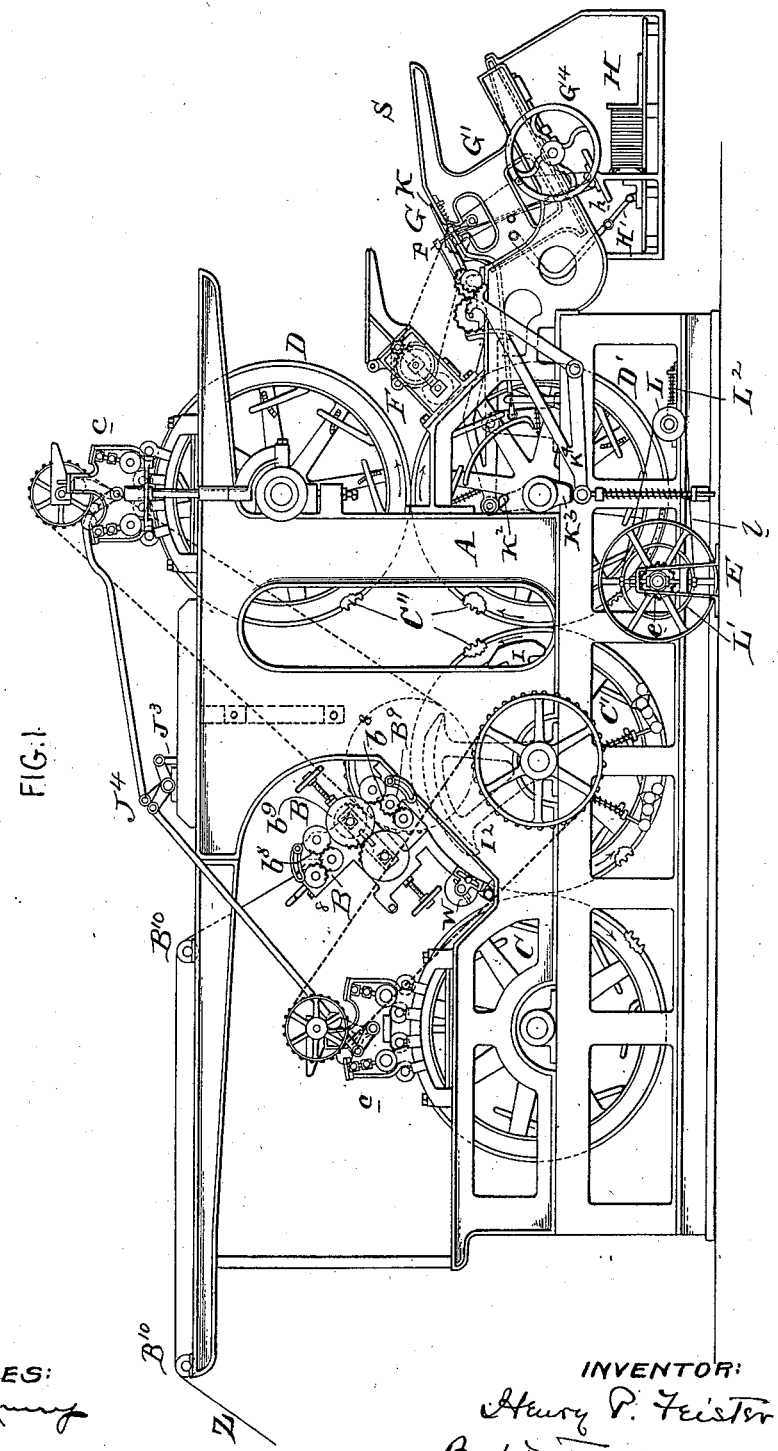

(No Model.)

H. P. FEISTER.
PERFECTING PRINTING PRESS.

No. 602,396.

9 Sheets—Sheet 2.

Patented Apr. 12, 1898.

WITNESSES:

INVENTOR:
Henry P. Feister
By his atty

THE NORRIS PETERS CO., PHOTO-LITHO., WASHINGTON, D. C.

(No Model.) H. P. FEISTER. 9 Sheets—Sheet 3.
PERFECTING PRINTING PRESS.
No. 602,396. Patented Apr. 12, 1898.
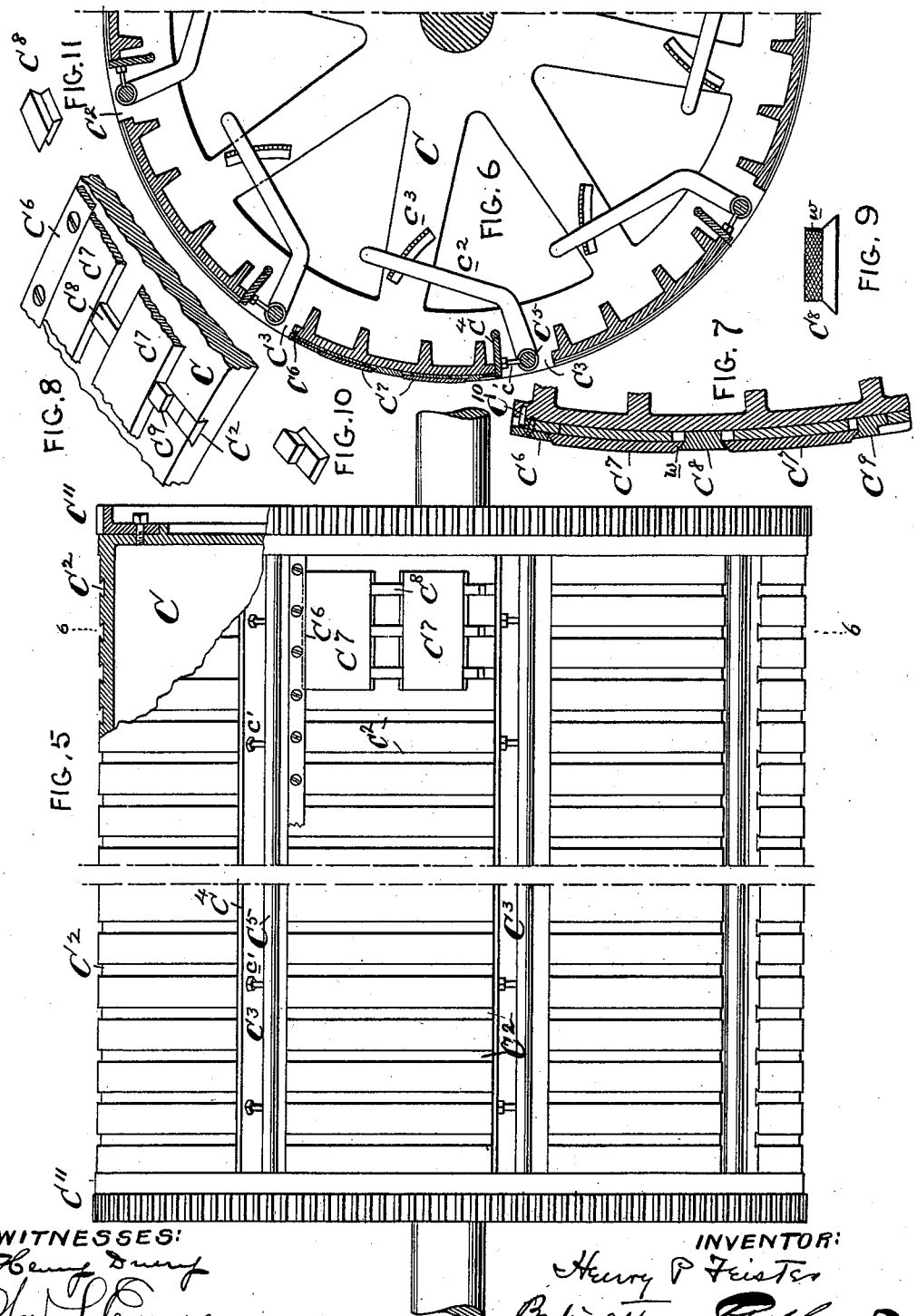

(No Model.)

9 Sheets—Sheet 4.

H. P. FEISTER.
PERFECTING PRINTING PRESS.

No. 602,396.

Patented Apr. 12, 1898.

WITNESSES:
Henry Drury
Wm. L. Evans

INVENTOR:
Henry P. Feister
By his atty

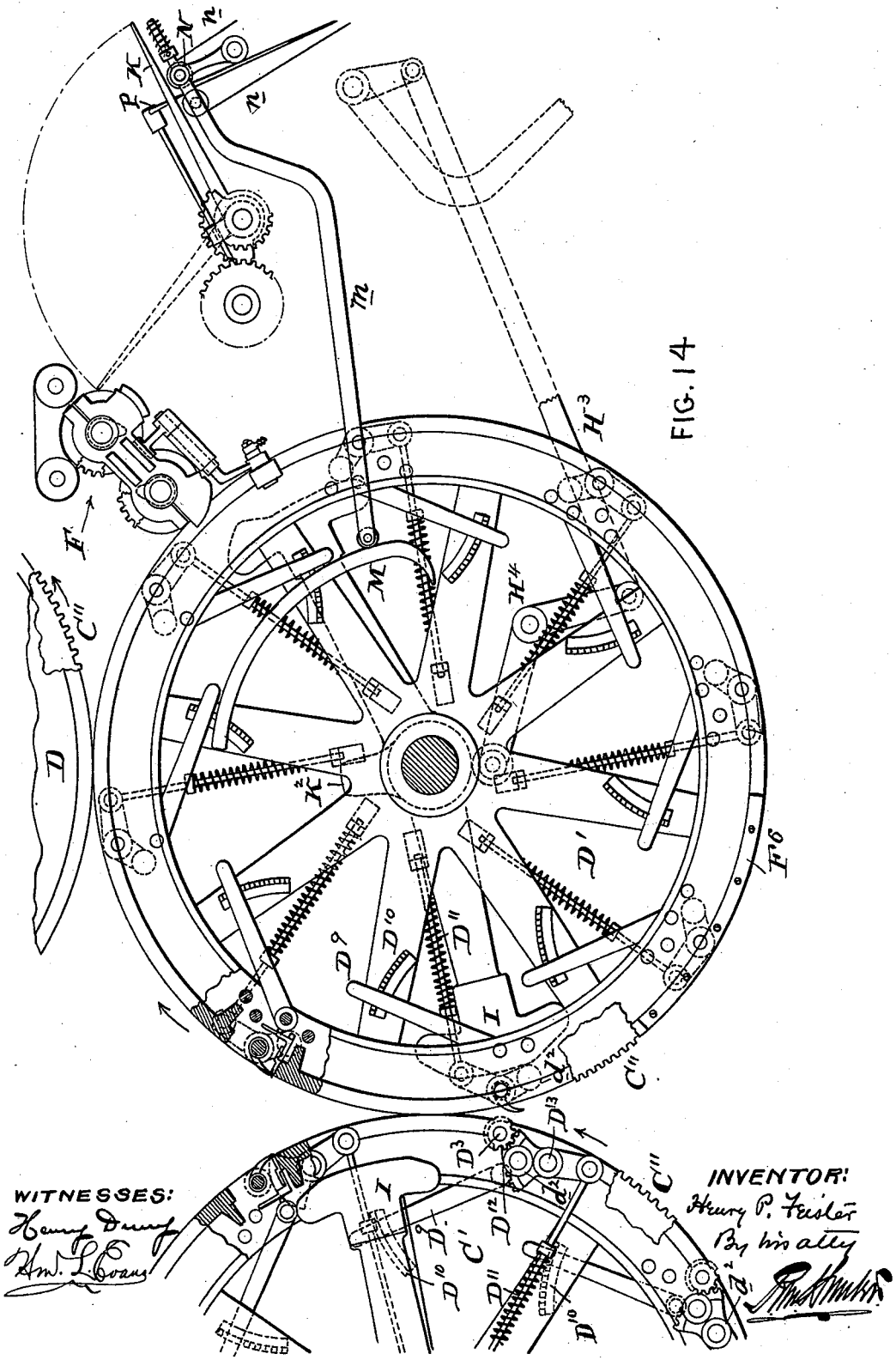

(No Model.)

H. P. FEISTER.
PERFECTING PRINTING PRESS.

No. 602,396. Patented Apr. 12, 1898.

WITNESSES:

INVENTOR:
Henry P. Feister
By his atty (No Model.)  9 Sheets—Sheet 7.

H. P. FEISTER.
PERFECTING PRINTING PRESS.

No. 602,396. Patented Apr. 12, 1898.

WITNESSES:   INVENTOR:
   Henry P. Feister
   By his atty (No Model.)
H. P. FEISTER.
PERFECTING PRINTING PRESS.
No. 602,396. Patented Apr. 12, 1898.
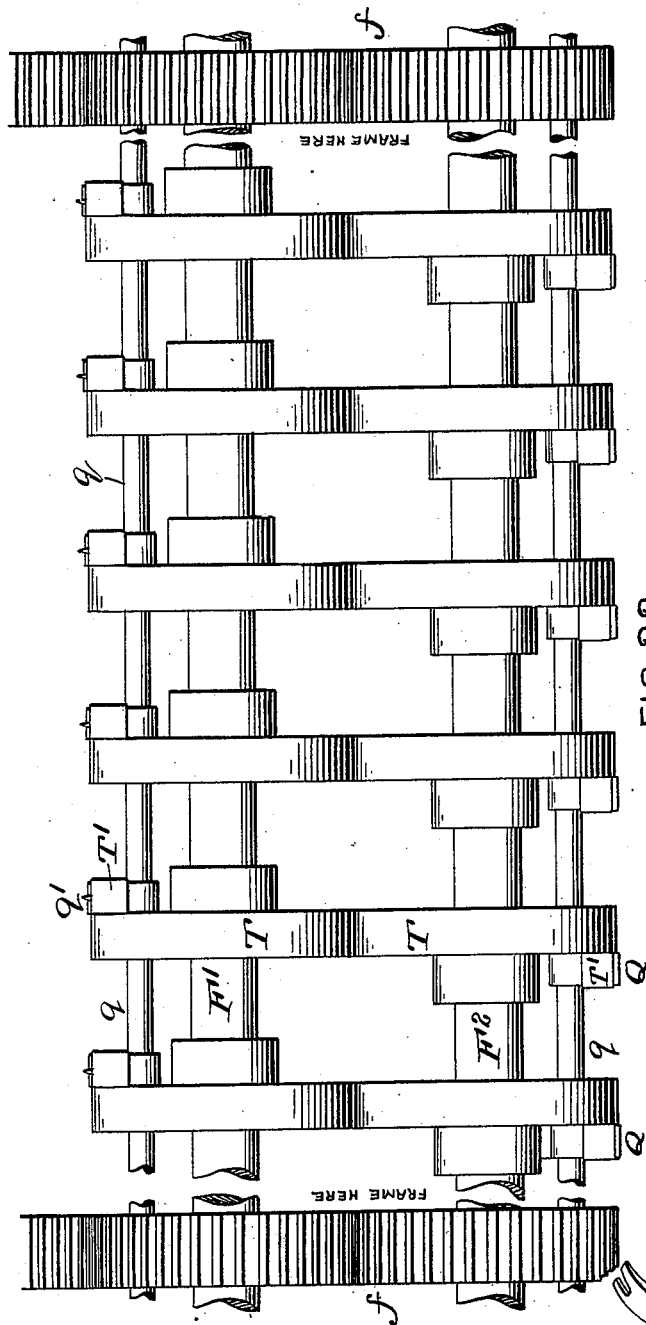
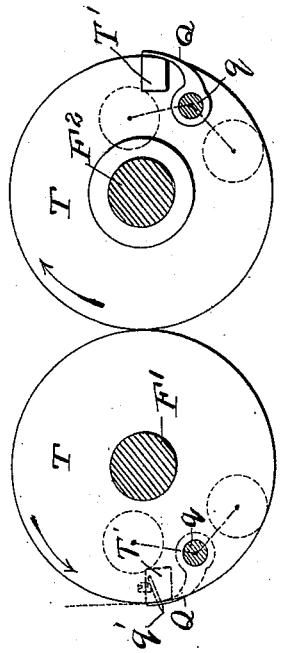
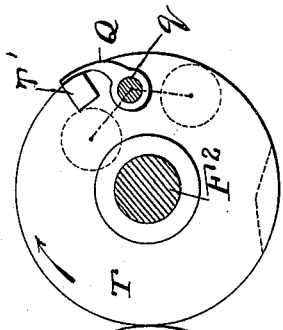
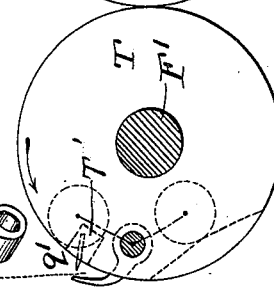
WITNESSES:
INVENTOR:
Henry P. Feister (No Model.)

H. P. FEISTER.
PERFECTING PRINTING PRESS.

No. 602,396.

Patented Apr. 12, 1898.

9 Sheets—Sheet 9.

WITNESSES:

INVENTOR:
Henry P. Feister
By his atty

UNITED STATES PATENT OFFICE.

HENRY P. FEISTER, OF PHILADELPHIA, PENNSYLVANIA, ASSIGNOR TO THE FEISTER PRINTING COMPANY, OF PENNSYLVANIA.

PERFECTING PRINTING-PRESS.

SPECIFICATION forming part of Letters Patent No. 602,396, dated April 12, 1898.

Application filed August 23, 1894. Serial No. 521,060. (No model.)

*To all whom it may concern:*

Be it known that I, HENRY P. FEISTER, of the city and county of Philadelphia and State of Pennsylvania, have invented an Improvement in Perfecting Printing-Presses, of which the following is a specification.

My invention has reference to perfecting printing-presses; and it consists of certain improvements fully set out in the following specification and shown in the accompanying drawings, which form a part thereof.

My improvements more especially relate to a class of perfecting printing-presses adapted to cut, print, and assemble sheets of paper in pamphlet form from a continuous web of paper substantially in the manner disclosed in Letters Patent No. 452,933, issued to me May 26, 1891.

My invention forming the subject-matter of the present application relates more particularly to the details of an organized perfecting printing-press, the improvements thereof being pointed out in the claims.

In carrying out my invention I employ in a compact perfecting printing-press the following features: first, two printing and impression cylinders in the form of an L, in which one printing-cylinder and two impression-cylinders are arranged in a substantially horizontal position and at a lower portion of the frame, so as to cause the center of gravity of the entire machine to be as low as possible; second, means employed on the printing-cylinders for holding the type-plates in position upon the surface of the cylinder, the said improvements comprising a series of circumferential dovetail or undercut grooves extending over the type-beds of the cylinder and combined with locking-pieces adapted to the said dovetail grooves for holding the type-forms in proper relative position, a permanent plate at one end of each of the frame-beds against which the type-forms are held, a movable locking-plate adapted to hold the locking-pieces positively in the grooves when the type-forms are in position, and cam-bars or locking devices for locking the movable locking-plates in position; third, nippers on the impression-cylinders, whereby they may properly receive the sheets and transfer them from one cylinder to the other and subsequently deliver the sheets in printed condition, the said improvements comprehending the usual pivoted nippers operated by cam devices combined with a pivoted frame carrying pin-points in connection with the ends of the nippers operated to hold the paper sheets and cam devices for holding the said pin-frames in operative position, said frames being made movable, so as to properly permit the tympan or movable plate being adjusted to the impression-surfaces and the proper position of the pin-points assured; fourth, perforating and cutting cylinders for the purpose of perforating the webs of paper at the proper distance apart to compensate for different sizes of sheets required in the printed pamphlet; fifth, means for the detaching of the perforated web into sheets at a time substantially coincident with the taking of the forward edges of the sheets by the nippers of the impression-cylinders; sixth, assembling and delivery devices for the several sheets, whereby the successive sheets may be successively assembled upon a cylinder through the media of nippers and then delivered by a transferring-cylinder arranged between the assembling-cylinder and folding devices, and cam devices for independently operating the nippers of said cylinders, first, for assembling the sheets, then for opening the nippers for the purpose of delivering the assembled sheets to the delivery-cylinder, and, finally, for delivering the sheets to the folding devices; seventh, folding devices adjustable relative to the fly-frame, so as to permit the proper adjustment of the sheets under the folding-knife to compensate for sheets of different sizes which may be printed upon the machine; eighth, cleaning devices for cleaning the impression-surfaces of the second impression-cylinder, so as to prevent blurring of the first impression.

Aside from the foregoing there are other details of improvement, which will be more fully understood by reference to the accompanying drawings, in which—

Figure 2:
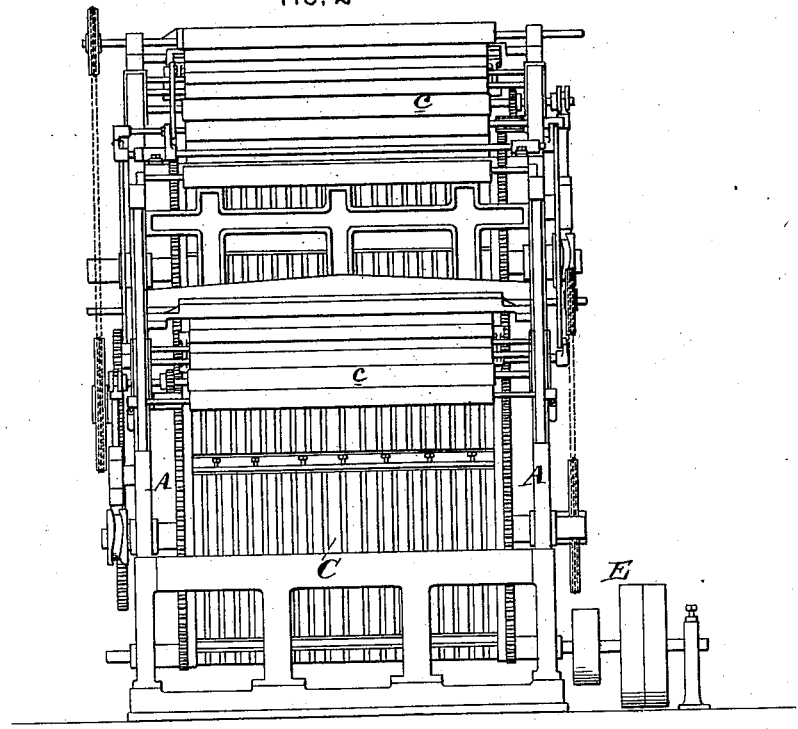
Figure 3:
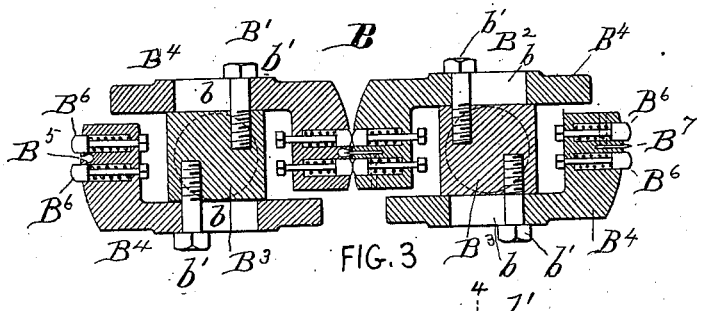
Figure 4:
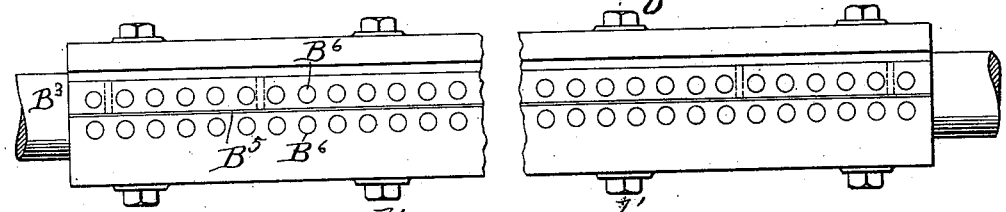

Figure 1 is a side elevation of the perfecting printing-press embodying my improvements. Fig. 2 is an end elevation thereof. Fig. 3 is a cross-section through the perforating-cylinders, taken on line 4 4 of Fig. 4. Fig.

Figure 12:
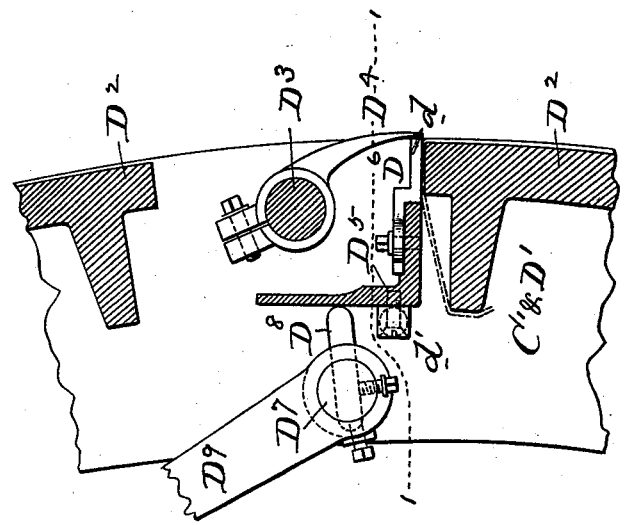
Figure 13:
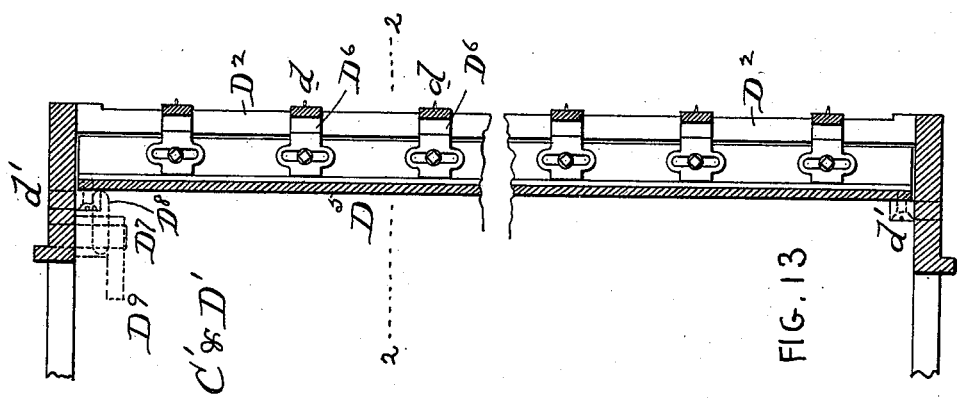
Figure 25:
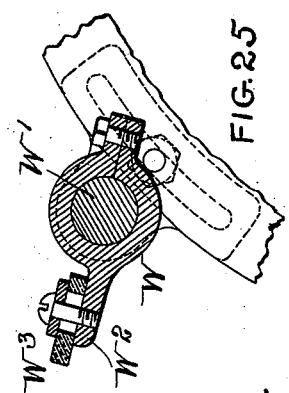
Figure 15:
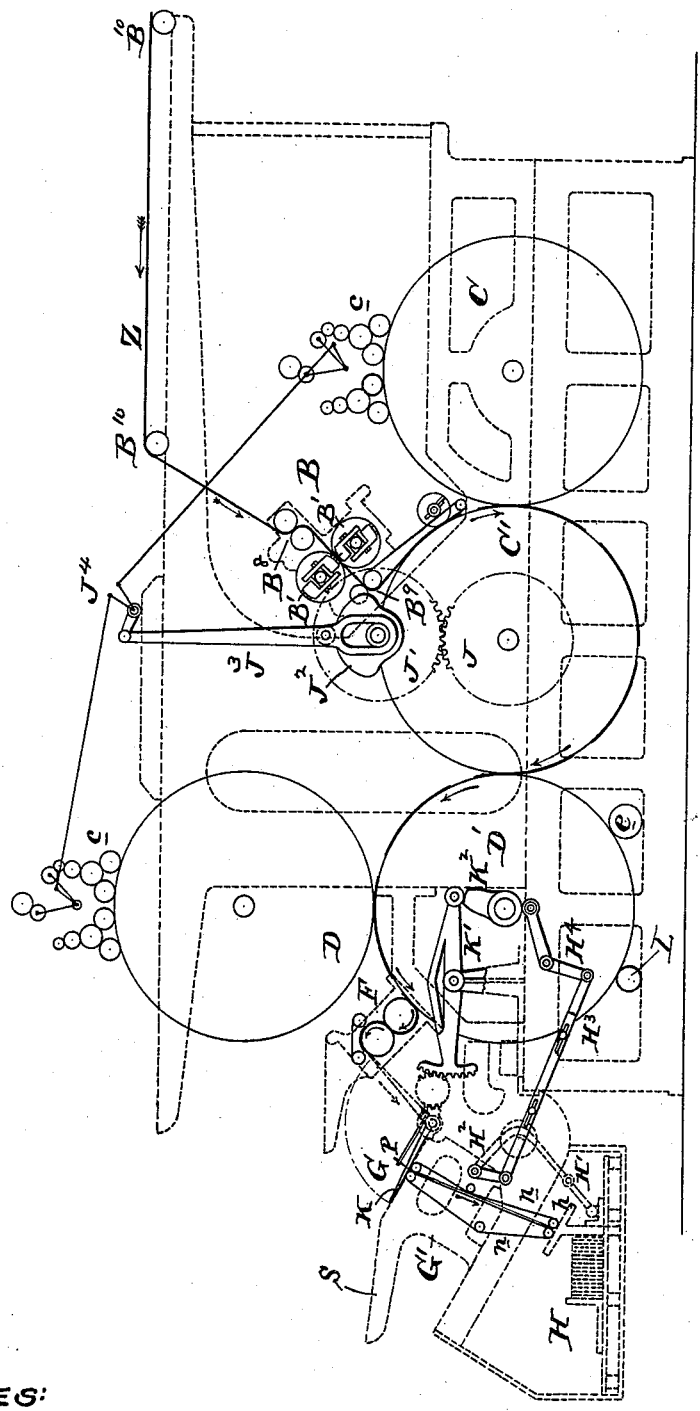
Figure 16:
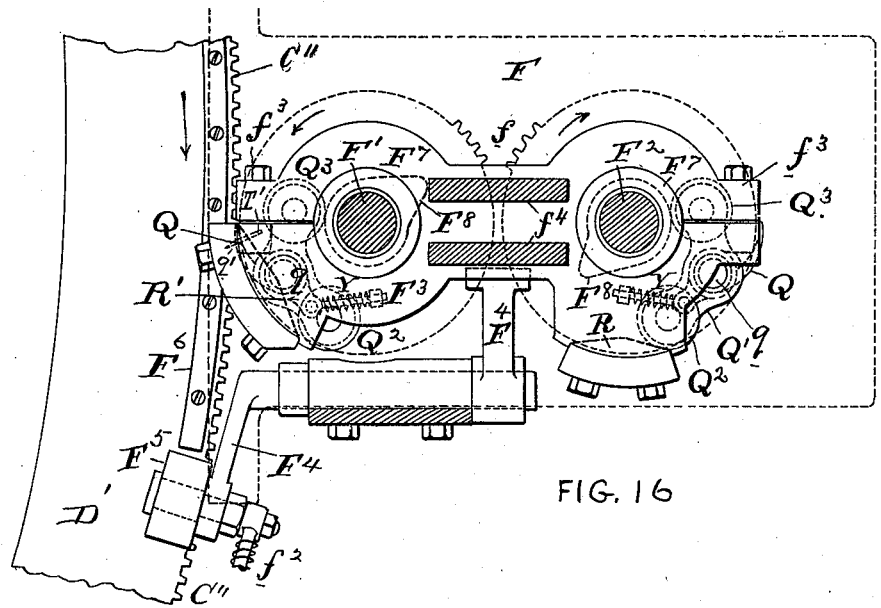
Figure 17:
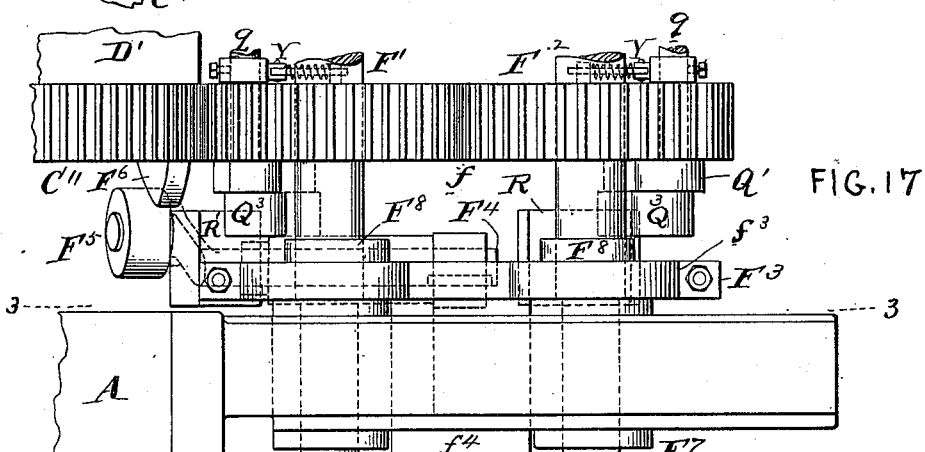
Figure 23:
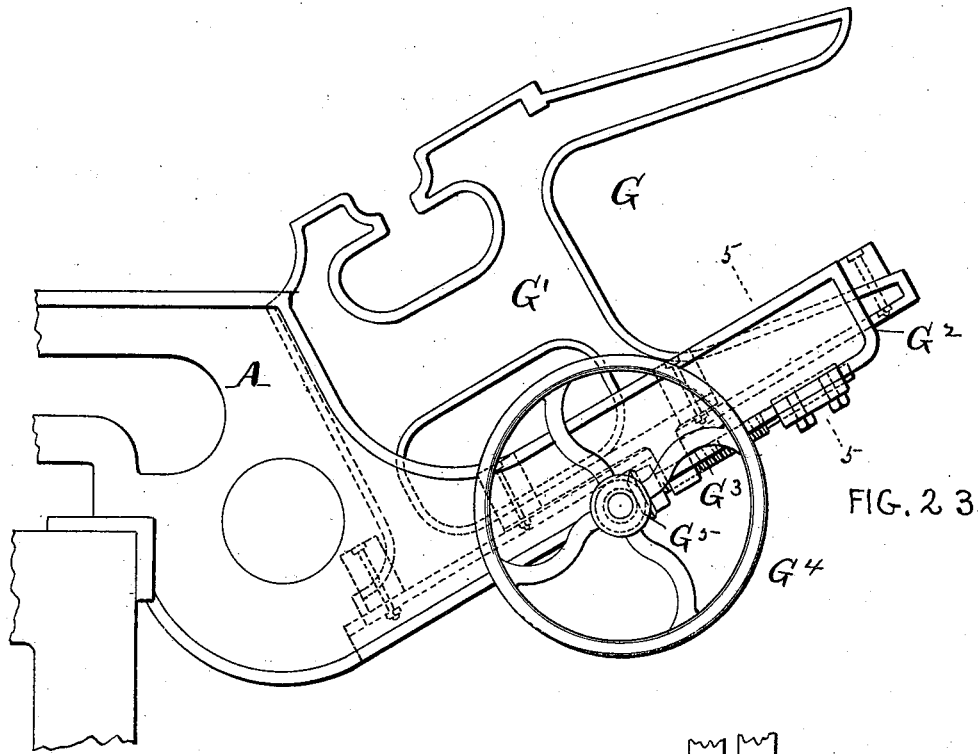
Figure 24:
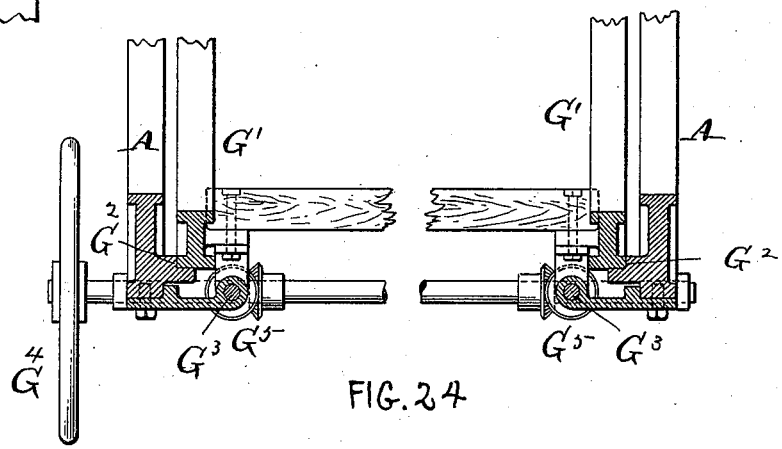
Figure 26:
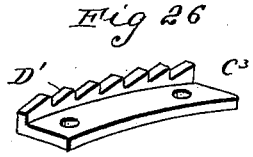

4 is a plan view of one of the perforating-cylinders. Fig. 5 is an elevation of one of the type-form cylinders with a portion in section. Fig. 6 is a cross-section of one-half of said cylinder on line 6 6 of Fig. 5. Fig. 7 is an enlarged view of one of the type-forms and locking-pieces. Fig. 8 is a perspective view showing the manner of arranging the type-forms and locking-pieces on the impression-cylinder. Fig. 9 is an end elevation of one of the locking-blocks. Figs. 10 and 11 are perspective views of two of the locking pieces or blocks for the type-forms. Fig. 12 is a cross-section on line 2 2 of Fig. 13, showing the details of the nipper devices of the impression-cylinders. Fig. 13 is a cross-section on line 1 1 of Fig. 12, illustrating the nipper arrangements of the impression - cylinders. Fig. 14 is an enlarged side elevation of one of the impression-cylinders and the adjacent impression and type cylinder, assembling and folding devices. Fig. 15 is a diagrammatic illustration of my improved printing-press, showing the movement of the paper over the machine and certain of the devices necessary for the manipulation at the machine from the reverse side of that indicated in Fig. 1. Fig. 16 is a sectional side elevation of the assembling devices, taken on line 3 3 of Fig. 17. Fig. 17 is a plan view of one end of same, showing the cam-operating devices. Figs. 18, 19, 20, and 21 are transverse sections of the assembling and delivery cylinders, showing the manipulations of the nippers during the assembling and delivery operations. Fig. 22 is a front elevation of the assembling devices. Fig. 23 is a side elevation of the adjusting devices for the folding mechanism. Fig. 24 is a cross-section of same on line 5 5 of Fig. 23. Fig. 25 is a cross-section of the sheet-detacher, and Fig. 26 is a perspective view of one of the racks employed for holding the clamping-levers.

A is the main frame of the machine.

B are the perforating-cylinders.

$B^8$ $B^9$ are the pairs of feeding-cylinders for the paper; $C'$, the first impression-cylinder; C, the first type-cylinder; $D'$, the second impression-cylinder, and D the second type-cylinder.

F is the assembling device.

G is the folding mechanism, and H is the packing device for the completed pamphlets.

The paper web Z is fed from a roll of paper in the usual manner and guided over the guide-rolls $B^{10}$ to the feeding-rolls $B^8$. From the feeding-rolls the paper passes over the perforating-cylinders B, and the perforated web next passes between the feeding-rolls $B^9$ and thence to the nippers of the impression-cylinder $C'$. The perforating-cylinders B are clearly illustrated in Figs. 3 and 4, and they consist of two separate cylinders $B'$ and $B^2$, suitably geared together, as is customary, and each comprising a central shaft $B^3$, preferably rectangular in cross-section and provided with two radially-adjustable frames $B^4$, having radial slots $b$, through which suitable clamping bolts or screws $b'$ pass, for holding the frames $B^4$ in proper adjustment on the central shaft $B^3$. In both of these cylinders the frames $B^4$ are essentially L-shaped in cross-section, and the outer surfaces, or those which are adapted to move in contact with the corresponding cylinder, are preferably made curved and are provided with a series of spring-fingers arranged in two rows, as clearly indicated in the drawings, the outer ends of which fingers are curved or rounded for the purpose of holding the sheet of paper without injury while the perforation takes place. The spring-fingers of the two cylinders $B'$ $B^2$ work in pairs, as indicated in Fig. 3, so that the paper is held immediately upon each side of the perforating blade or cutter $B^7$ of one cylinder and the recess $B^5$ of the other cylinder, into which the perforating-blade enters. The perforating-blade $B^7$ is made with a series of teeth in the usual manner, so that it does not completely sever the web of paper, but performs a series of perforations which permits the paper to be readily detached. The perforating-cylinders are thus made adjustable, so as to provide different diameters to suit sheets of different lengths, the different diameters being necessary, so that the perforating devices may be moved with a speed commensurate with the movement of the sheet, and thus prevent tearing of the sheet. The feeding-cylinders $B^8$ and $B^9$ are respectively geared, so as to revolve in pairs at the same surface speed, and all of the cylinders are geared relatively to the impression-cylinder $C'$, as indicated in Figs. 1 and 15, so as to positively drive all of said cylinders or rolls at definite speeds. When any adjustment is made to the perforating-cylinders, the feeding-rolls are driven at a greater or less speed to correspond by changing the size of gears $b^8$ relatively to gears $b^9$. The adjustable gearing devices may be similar to any of those used upon lathes or printing-presses heretofore constructed, and therefore will not be further described in detail. The perforated web of paper before being separated is caught by the nippers $D^4$ and pressed upon the pin-point $d$, and while the impression-cylinder $C'$ is moving the revolving detacher W, rotating at a slightly greater surface speed than the surface speed of the paper web, causes the sheet which is in the custody of the nippers to be detached along the line of perforations from the web. The detaching of the sheet takes place practically at the time the nippers catch the forward edge thereof. The detacher W consists, essentially, of a revolving shaft $W'$, having an adjustable support $W^2$ secured thereto, and a transverse pressure-strip, preferably of leather or rubber $W^3$, secured to said part $W^2$ and radially adjustable thereon, so as to permit of its adjustment to increase or decrease its pressure upon the paper traveling with the impression-cylinder. As both the impression-cylinder and the detacher move with substantially the same speeds, and both of which are greater than the surface speed of the paper web, it is self-evident that when the detacher comes into operation the sheet is detached from the web by this increased speed. The detacher is more clearly shown in Fig. 25. The surface speed of the impression-cylinder C' is greater than the surface speed of the web of paper, because the surface of the cylinder is made up of the impression-surfaces $D^2$, the spaces between said impression-surface in which the nippers are arranged, and which combined distances are greater in length than the length of the sheets of paper which would be arranged upon each one of the impression-surfaces. It is essential that the forward edge of the web shall be received immediately upon the pin-points, so as to be caught by the nippers irrespective of the distance that the rear end of the sheet is from the rear end of the impression-surface. In a machine of this class the adjustments are always made from the forward part of the impression-surface or the type-form bed. The impression-cylinders C' D' may have their impression-surfaces covered with felt in the usual manner. The nippers $D^4$ are secured to a rock-shaft $D^3$, which extends to the sides of the impression-cylinders and is provided with a pinion $D^{12}$, with which pivoted rack-segment $D^{13}$ meshes. The pivoted rack-segments of the various nipper-shafts are moved in one direction for closing the nippers by a rod and spring $D^{11}$ and in the other direction by a roller $d^2$ coming in contact with stationary cams I, which are adapted to open the nippers for the purpose of liberating the sheets, and also in the case of the transfer of the sheets for opening the nippers of the impression-cylinder D' for the purpose of receiving the forward edges of the sheets. The pin-points $d$ are secured upon laterally-adjustable pieces $D^6$, which pieces are bolted to a transverse bar $D^5$, pivoted at $d'$ in the impression-cylinders. The frame $D^5$, with its pin-points, is adjusted to or from the forward end of the impression-surfaces $D^2$ of the impression-cylinder by means of an adjustable cam $D^8$, pivoted at $D^7$ to the impression-cylinder, and moved by an arm $D^9$, adapted to be held in position by suitable racks $D^{10}$. (Shown in Fig. 26.) It will be observed that the rack $D^{10}$ prevents the frame $D^5$ from working backward, and it is held from movement in the other direction by the soft pad at the end of the impression-surfaces. These constructions are clearly illustrated in Figs. 12, 13, and 14. The construction of the impression-cylinders C' D' is substantially the same, so that the description of the parts of one correspond to the description of the parts of the other.

C is the first type-form cylinder and has its surfaces divided into a series of type-form beds, upon which the type-forms are securely clamped. The ink is delivered to the type-forms by suitable inking devices $c$, which inking devices may be of any suitable construction. The type-forms, type-form clamps, and general construction of the type-cylinder are clearly illustrated in Figs. 5 to 11. An examination of these figures will show that the type-form cylinder is provided with a series of type-form beds separated by spaces $C^3$, and these type-form beds are provided with a series of circumferential grooves $C^2$, the said grooves being essentially dovetail or undercut in cross-section. Fitted in these grooves are the clamping-blocks $C^6$, $C^8$, and $C^9$, and between the blocks $C^6$, $C^8$, and $C^9$, respectively, are arranged the type-forms, as is clearly illustrated in Figs. 5, 7, and 8. The clamping-blocks have their lower parts dovetail in shape to fit into the grooves $C^2$, and have their clamping edges also undercut and preferably roughened, as at $w$, but at right angles to the dovetail portion, so as to clamp the transverse edges of the type-forms. $C^6$ essentially forms a thrust-plate or transverse abutment and is secured to the type-form bed and may be provided with dovetail pieces, which fit into the grooves $C^2$ and which are held from movement by pins $C^{10}$, Fig. 7. The type-form plates and clamping-blocks are then arranged as indicated and held in position by the locking-plate $C^4$, which is pivoted or movably held at its ends to the type-form cylinder. This plate is moved up against the ends of the clamping-blocks and prevents them from moving backward in the grooves, and thus holds the type-plates in a firm clamped position upon the surface of the cylinder. The plate $C^4$ is locked in position by an adjustable cam projection $c'$, formed on a rocking bar $C^5$, which is provided with a lever $c^2$ and a holding-rack $c^3$, Fig. 26, so that when the rocking bar $c^5$ is turned to bring the cam projections $c'$ into position to lock the bar or plate $C^4$ in proper position it may be locked against displacement by the rack devices. The cam projections $c'$ are preferably formed as screws adjusted into the rocking bar $C^5$, so as to be adjustable as to their cam action to suit any slight differences in the position of the plate $C^4$ due to variations in the locking devices or type-forms, as will be readily understood. These devices form a ready means for securing the type-forms upon the surface of the type-form cylinder and enables changes in the matter upon the type-form cylinder to be readily made without the consumption of an excessive amount of time. It is evident that the details of the cam devices for locking the plates $c^4$ may be varied without changing the principle of the operation or construction. The above description with reference to the printing-cylinder C also applies to the printing-cylinder D, as they are essentially the same in all material particulars. The printing-cylinder D is also provided with inking-rolls $c$ of substantially the same construction as the inking-rolls of the cylinder C.

The various cylinders C C' D D' are geared together by gearing $C^{11}$, so as make them all run at the same surface speeds and in the proper directions, and these cylinders are put into motion by a pinion $e$, meshing with the cylinder D' by a power-shaft pulley E. The arrangement of these cylinders C C' D D' in the manner illustrated, wherein the cylinders C, C', and D' are arranged substantially horizontal and at the lower part of the machine and the cylinder D in an elevated position, enables me to bring the center of gravity of the entire machine very low, so as to make it run more steadily and with less wear and tear upon the moving parts. The more steadily the machine runs the less liability of imperfect printing and the greater the durability of the structure as a whole.

The shaft of the impression-cylinder C' is fitted with a gear-wheel J, meshing with a gear-wheel J', which latter is provided with a cam $J^2$, adapted to operate a vertically-reciprocating bar $J^3$, which in turn operates a bell-crank rock-shaft $J^4$ and by it transmits motion to the usual reciprocating inking-rolls for transferring ink from the fount to the distributing-rolls. This mechanism is clearly shown in Fig. 15.

L is a cleaning-roll, of any suitable construction, adapted to wipe the surface of the second impression-cylinder D' prior to its receiving the sheets from the cylinder C' for the purpose of cleaning the surfaces thereof and avoid blurring the first impression. This roll is pressed toward the cylinder D' by a suitable spring device $L^2$ and is driven by a belt $l$ from a belt-wheel L' upon the power-shaft. This is clearly shown in Fig. 1. By this construction I am enabled to dispense with the movable tympan or web heretofore employed.

Figures 20, 21:
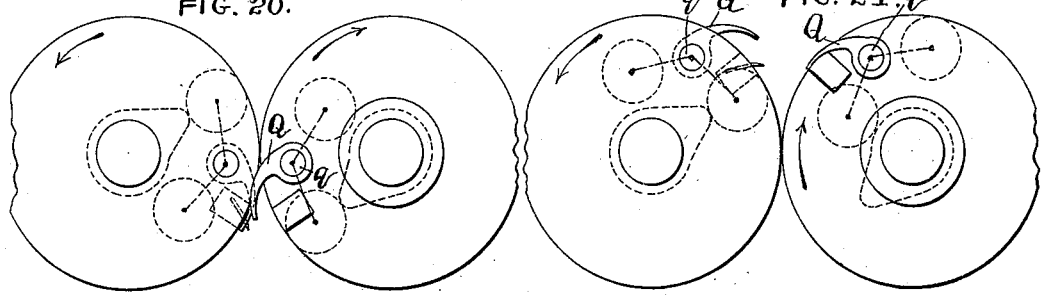

The assembling device F will now be described. It comprises, essentially, two cylinders, each made up of a series of disks T, secured upon the shafts F' $F^2$, which shafts are geared together by gearing $f$ and which gears mesh with the gears $C^{11}$ of the impression-cylinder D', as is clearly shown in Figs. 14, 16, 17, and 22. Each of these cylinders of the assembling device is provided with a nipper-shaft $q$, having a series of nippers Q, adapted to operate in connection with pins $q'$, projecting outwardly from blocks T', secured to each of the several disks on the assembling-cylinder, or that next to the impression-cylinder D', and in connection with blocks T', without pins, on the delivery-cylinder, or that formed on the shaft $F^2$. The nipper-shafts $q$ are secured at their ends to bell-crank levers Q', having at one end a cam-roller $Q^2$ and at the other end a cam-roller $Q^3$. The rollers $Q^3$ are adapted to operate in connection with cams $F^8$ to open the nippers Q, and rollers $Q^2$ are adapted to operate in connection with the cams R and R', respectively, and are also for opening the nippers. The cam R' operates to open the nippers of the assembling-cylinder, as indicated in Fig. 18, so that it takes the successive sheets from the impression-cylinder D' and puts them upon the pins $q'$, as indicated in Fig. 19. The nippers are normally closed by springs Y. The cams $F^8$ operate the nippers of both the assembling-cylinder and the delivery-cylinder, as indicated in Figs. 20 and 21, for the purpose of making the nippers of the assembling-cylinder release all of the sheets assembled upon the pins and allow said sheets to be taken by the nippers of the delivery-cylinder. The cam R operates the nippers Q of the delivery-cylinder for the purpose of releasing the assembled sheets and permitting them to be received upon the fly-frame K, which transfers them onto the folding-machine G. The cams R, R', and $F^8$ are carried upon a laterally-adjustable frame $F^3$, said frame being guided by suitable guides $f^4$ on the main frame A. This frame is reciprocated at set intervals by a cam $F^6$ on the impression-cylinder D' operating in conjunction with a roller $F^5$ and a bell-crank $F^4$. The said bell-crank is moved in one direction by a spring device $f^2$ and in the other direction by said cam $F^6$. Normally the cams $F^8$ are in the position shown in Fig. 17, so that the nippers are not operated by said cams. The nippers are, however, operated by the cam R' to receive the successive sheets from the impression-cylinder to assemble them upon the assembling-cylinder, and the nippers of the delivery-cylinder are operated by the cam R; but this latter operation is immaterial except when in the act of delivering assembled sheets. When all of the sheets are assembled upon the pins $q'$, the cam $F^6$ causes the bell-crank $F^4$ to be reciprocated, moving over the frames $F^3$ laterally and bringing the cams $F^8$ into operative position to actuate the nippers. When thus done, the operation shown in Figs. 20 and 21 takes place and we have the assembled sheets upon the assembling-cylinder released by the nippers of that cylinder and said assembled sheets delivered to the delivery-cylinder in custody of its nippers. The sheets in this assembling-cylinder are not held upon pins, but are merely held by friction sufficient to carry them around and deliver them to the fly-frame, which latter action takes place as soon as the cam R comes into operation. The cams $F^8$ only come into operation once for each complete revolution of the cylinder D', or they may come into operation more often if the pamphlets are to be composed of fewer number of sheets, in which case the assembled sheets may be discharged two or more times for each revolution of the impression-cylinder by simply adding additional cams $F^6$ about its periphery. The cams $F^8$ require the very nicest adjustment to enable the nippers to release and grip the sheets at the proper instant, and to do this I employ the following simple construction: The frame $F^3$ is split at each end to form clamps $f^3$. The cams $F^8$ are provided with circular portions, which fit into apertures in said frame $F^3$ and are grasped and held by friction therein by simply tightening the clamps $f^3$. In this manner the cams $F^8$ may be adjusted about their center, so as to come into action at precisely the exact instant.

If a cover is to be placed on the pamphlets, the covers may be laid upon the table S and delivered upon the folder by hand in advance of the delivery by the fly-frame of the assembled sheets. This fly-frame K may be operated in any suitable manner. As shown, however, it is operated by a pinion and bellcrank rack-lever $K^4$ and a cam $K^3$ upon the shaft of the impression-cylinder D'. It is evident that in this manner for each revolution of the impression-cylinder the fly-frame K will deliver the assembled sheets. When the assembled sheets are held upon the table of the folding-machine G, the folding-blades P are forced down through the fingers of the fly-frame to fold the central portions of the sheet between two feeding-bands $m$ and $n$, passing over suitable rollers. The folding-fingers are operated by suitable gears and pivoted rack-frame K' and a cam $K^2$ (clearly shown in Fig. 15) and is brought into action after the fly-frame has laid the sheets upon the table. One of the rollers guiding the feeding-bands $n$ of the folding-machine is moved laterally to open the orifices or spaces between the bands for the entrance of the folded sheets after the folding-knife descends and the crease has been made, and this is accomplished by a bar $m$ and a cam M upon the impression-cylinder D', as is clearly shown in Figs. 1 and 14. In this manner the sheets are first creased and pinched to make the fold, and then the pressure is taken off to avoid blurring the printing. The folded pamphlets are fed down by the bands $n$ and delivered to the stacking or packing apparatus H, which may be of any suitable construction, that shown having a reciprocating head $h$, reciprocated by the link H' and bell-crank $H^2$, the latter being moved by a link $H^3$, bell-crank $H^4$, and cam $K^2$.

The folding-machine comprises a frame G', carrying the feeding aprons or bands $n$, independently movable relatively to the fly-frame and assembling devices, so that it may be adjusted upon the main frame A to bring the fold exactly in the right place to suit the particular size of sheets employed. The details of this adjustment are clearly shown in Figs. 23 and 24. It will be seen that the frame G' is guided in suitable parallel guides in the main frame A and is moved in its adjustment by screw-shafts $G^3$, rotated by a hand-wheel $G^4$ and pinions $G^5$, as is self-evident by an examination of the drawings. In this manner the adjustment is made and insures the most correct fold and margin in the finished pamphlet. It is of course evident that the adjustment may be performed in any other suitable manner.

The pamphlets may have their several sheets secured together by paste, stapling, or stitching; but this feature forms no part of my present application, and therefore I will not further refer thereto.

I do not confine myself to the minor details of construction with respect to these various improvements which I have described, as it is evident that they may be very materially modified in minor particulars without in the least departing from the general features or principle of the invention.

Having now described my invention, what I claim as new, and desire to secure by Letters Patent, is—

1. Perforating-cylinders for a printing-press, consisting of two shafts, each having adjustably secured thereto at points intermediate of its length radially-adjustable L-shaped bars in which the bars of one of the cylinders is provided with grooves on diametrically opposite sides and the bars of the other cylinder with perforating cutters or blades, and a series of spring-fingers on each of the cylinders arranged upon each side of the grooves and perforating-blades, whereby the paper is held on each side of the line of perforations during the perforating operation and the distance between the perforations is adjustable.

2. An impression-cylinder for a printing-press having a series of impression-surfaces or beds arranged about its periphery, a series of nippers arranged at the forward end of each of the beds, and a series of pivoted adjustable transverse frames also arranged at the forward part of each of the beds and with which the nippers operate, in combination with power devices for operating the nippers at predetermined intervals.

3. An impression-cylinder for a printing-press having a series of impression-surfaces or beds arranged about its periphery, a series of nippers arranged at the forward end of each of the beds, and a series of pivotally-adjustable transverse frames also arranged at the forward part of each of the beds and with which the nippers operate and having pins projecting outwardly upon which the paper sheets are clamped by the nippers, and adjusting devices to adjust the position of the frames holding the said pins whereby all of the nipper-seats and pins are adjusted simultaneously.

4. An impression-cylinder for a printing-press having a series of impression-surfaces or beds arranged about its periphery, in combination with a series of nippers arranged at the forward end of each of the beds, a series of laterally-adjustable parts or nipper-seats provided with outwardly-projecting pins with which the nippers operate, pivoted frame holding said nipper-seats and adjusting devices for adjusting the said frames to bring the pins in proper relative position with respect to the beds and nippers.

5. In an impression-cylinder, the combination of nippers arranged at the forward part of the bed or impression-surface thereof, a circumferentially-adjustable frame carried by the impression-cylinder also at the forward part of the bed and a series of laterally-adjustable nipper-seats carried by the frame adapted to receive the rear or free end of the nippers.

6. In an impression-cylinder, the combination of nippers arranged at the forward part of the bed or impression-surface thereof, a circumferentially-adjustable frame carried by the impression-cylinder also at the forward part of the bed, a series of laterally-adjustable nipper-seats carried by the frame adapted to receive the rear or free end of the nippers, pins projecting outward from the said adjustable frame, and adjusting devices for simultaneously adjusting the frame and all of its pins relative to the forward part of the bed.

7. In a perfecting printing-press, the combination of printing and impression cylinders with an assembling device for assembling the printed sheets, delivery devices for delivering the assembled sheets, a folding-machine for folding the assembled sheets delivered to the delivery devices, a frame structure for holding the several parts in fixed relation, and adjusting devices for adjusting the folding device relatively to the delivering devices whereby the line on which the sheets are folded may be varied as desired.

8. In a perfecting printing-press, the combination of printing devices for printing the sheets of paper on both sides, an assembling device for assembling the printed sheets one upon the other, delivery devices for delivering the assembled sheets from the assembling devices to folding devices, folding devices for folding the printed sheets, a frame structure supporting the printing device assembling device and delivery devices, and means to adjust the frame of the folding devices relatively to the frame of the assembling and delivery devices.

9. A printing-cylinder for a printing-press consisting of a cylinder having a series of parallel circumferential dovetail-shaped or undercut grooves, transverse abutments secured to the surface of the cylinder against which the type-plates are adjusted, intermediate clamping-blocks adapted to the circumferential grooves to clamp the type-forms firmly to the surface of the type-beds of the cylinder, and means to apply pressure simultaneously upon the series of clamping-blocks and press them at the same time toward the transverse abutment whereby the several parts are adjusted simultaneously and held firmly in position.

10. A printing-cylinder for a printing-press consisting of a cylinder having a series of parallel circumferential dovetail-shaped or undercut grooves, transverse abutments secured to the surface of the cylinder against which the type-plates are adjusted, intermediate clamping-blocks adapted to the circumferential grooves to clamp the type-forms firmly to the surface of the type-beds of the cylinder, means to apply pressure upon the clamping-blocks and press them toward the transverse abutment consisting of a pivoted plate having its ends adapted to press upon the clamping-blocks, a shaft provided with cam projections adapted to press upon the clamping-plate at intervals in its length, and a device for adjusting the cam-shaft and locking it in position.

11. In a perfecting printing-press, devices for printing the sheets of paper successively upon both sides, assembling devices for assembling the sheets so printed consisting of a revolving cylinder having a series of projecting pins, a series of nippers working in connection with said pins, a rock-shaft adapted to operate the nippers simultaneously, a cam device to open the nippers at predetermined intervals to receive the sheets and press them upon the pins, cam devices for operating the nippers to remove them from the assembled sheets after a definite number of revolutions have been made, power devices for throwing the last-mentioned cam into and out of operative position at specified intervals, and delivery devices for delivering the assembled sheets from the assembling devices after a given number of sheets have been assembled.

12. In a perfecting printing-press, devices for printing the sheets successively upon both sides, assembling device for assembling the sheets so printed consisting of a revolving cylinder having a series of projecting pins and nippers, a rock-shaft adapted to operate the nippers simultaneously, lever and roller devices for rocking the rock-shaft, cam devices operating upon one of the rollers to open the nippers at predetermined intervals to receive the sheets and press them upon the pins, laterally-adjustable cam devices working with the other roller for operating the nippers to remove them from the assembled sheets after a definite number of revolutions have been made, power devices for throwing the last-mentioned cam laterally into and out of operative position at specified intervals, and delivery devices for delivering the assembled sheets from the assembling device after a given number of sheets have been assembled.

13. In a perfecting printing-press, devices for printing the sheets of paper successively upon both sides, assembling devices for assembling the sheets so printed consisting of a revolving cylinder having a series of projecting pins, a series of nippers working in a connection with said pins, a rock-shaft adapted to operate the nippers simultaneously, a cam device to open the nippers at predetermined intervals to receive the sheets and press them upon the pins, cam devices for operating the nippers to remove them from the assembled sheets after a definite number of revolutions have been made, power devices for throwing the last-mentioned cam devices into and out of operative position at specified intervals, delivery devices for delivering the assembled sheets from the assembling devices after a given number of sheets have been assembled consisting of a revolving cylinder provided with nippers, cam devices operated by the power devices to open the nippers for the purpose of receiving the assembled sheets from the assembling devices, and a cam device to open the nippers for the purpose of liberating the assembled sheets from the delivery-cylinder.

14. In a perfecting printing-press, devices for printing the sheets of paper successively upon both sides, assembling devices for assembling the sheets so printed consisting of a revolving cylinder having a series of projecting pins, a series of nippers working in connection with said pins, a rock-shaft adapted to operate the nippers simultaneously, a cam device to open the nippers at predetermined intervals to receive the sheets and press them upon the pins, cam devices for operating the nippers to remove them from the assembled sheets after a definite number of revolutions have been made, power devices for throwing the last-mentioned cam devices into and out of operative position at specified intervals, delivery devices for delivering the assembled sheets from the assembling devices after a given number of sheets have been assembled consisting of a revolving cylinder provided with nippers, cam devices operated by the power devices to open the nippers for the purpose of receiving the assembled sheets from the assembling devices, a cam device to open the nippers for the purpose of liberating the assembled sheets from the delivery-cylinder, and a fly-frame adapted to receive the assembled sheets from the delivery-cylinder.

15. In a perfecting printing-press, devices for printing the sheets of paper successively upon both sides, assembling devices for assembling the sheets so printed consisting of a revolving cylinder having a series of projecting pins, a series of nippers working in connection with said pins, a rock-shaft adapted to operate the said nippers at predetermined intervals to receive the sheets and press them upon the pins, cam devices for operating the nippers to remove them from the assembled sheets after a definite number of revolutions have been made, power devices for throwing the last-mentioned cam device into and out of operative position at specified intervals, delivery devices for delivering the assembled sheets from the assembling devices after a given number of sheets have been assembled consisting of a revolving cylinder provided with nippers, cam devices operated by the power devices to open the nippers for the purpose of receiving the assembled sheets from the assembling device, a cam device to open the nippers for the purpose of liberating the assembled sheets from the delivery-cylinder, a fly-frame adapted to receive the assembled sheets from the delivery-cylinder, and a folding device adapted to receive the assembled sheets from the fly-frame.

16. The combination of printing devices for printing sheets of paper having an impression-cylinder for delivering the printed sheets to the assembling devices, assembling devices for assembling said sheets of paper, folding devices for folding the assembled sheets of paper, creasing devices for imparting a pressure to the folded paper sheets when being folded, and means operated by a cam rotating with the impression-cylinder acting on the creasing devices for removing said pressure after the crease is made, whereby the folded sheets are fed through the folding-machines without blurring the printed portions thereof.

In testimony of which invention I have hereunto set my hand.

HENRY P. FEISTER.

Witnesses:
BENJ. L. LEHMAN,
ERNEST HOWARD HUNTER.